May 21, 1935.  J. F. HIGBEE  2,001,875
BRAKE
Filed Sept. 26, 1931  3 Sheets-Sheet 1

INVENTOR.
James F. Higbee
BY
Parker & Burton
ATTORNEYS.

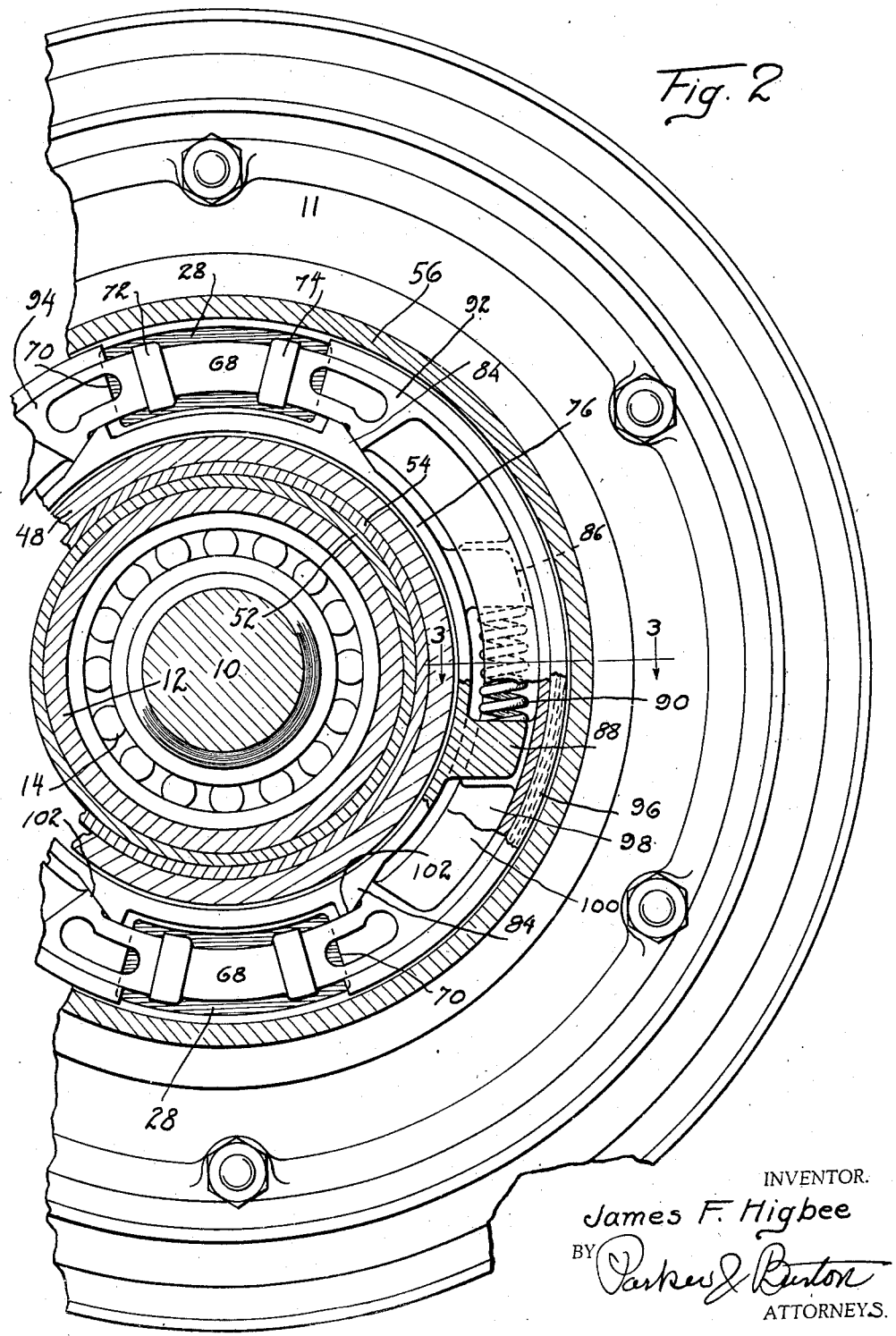

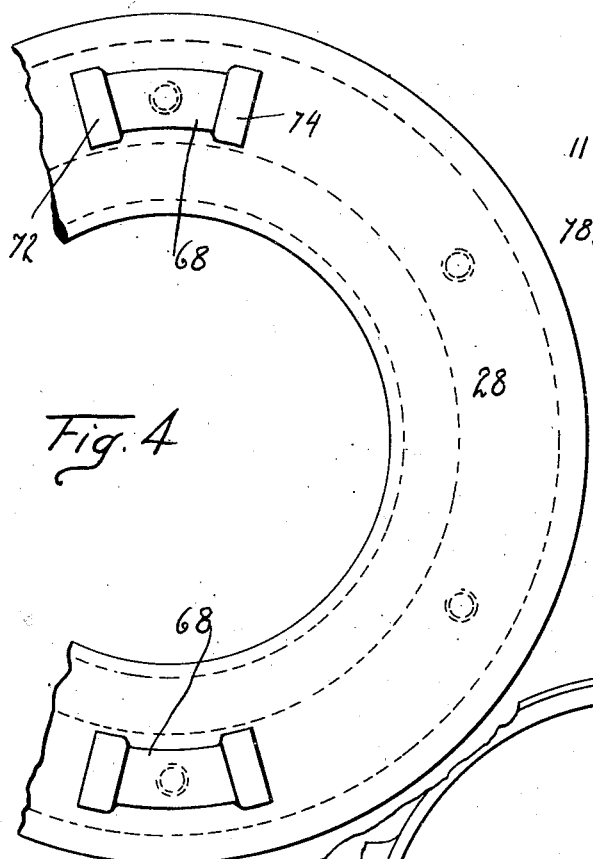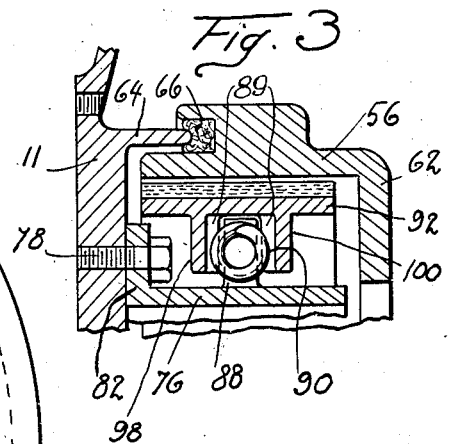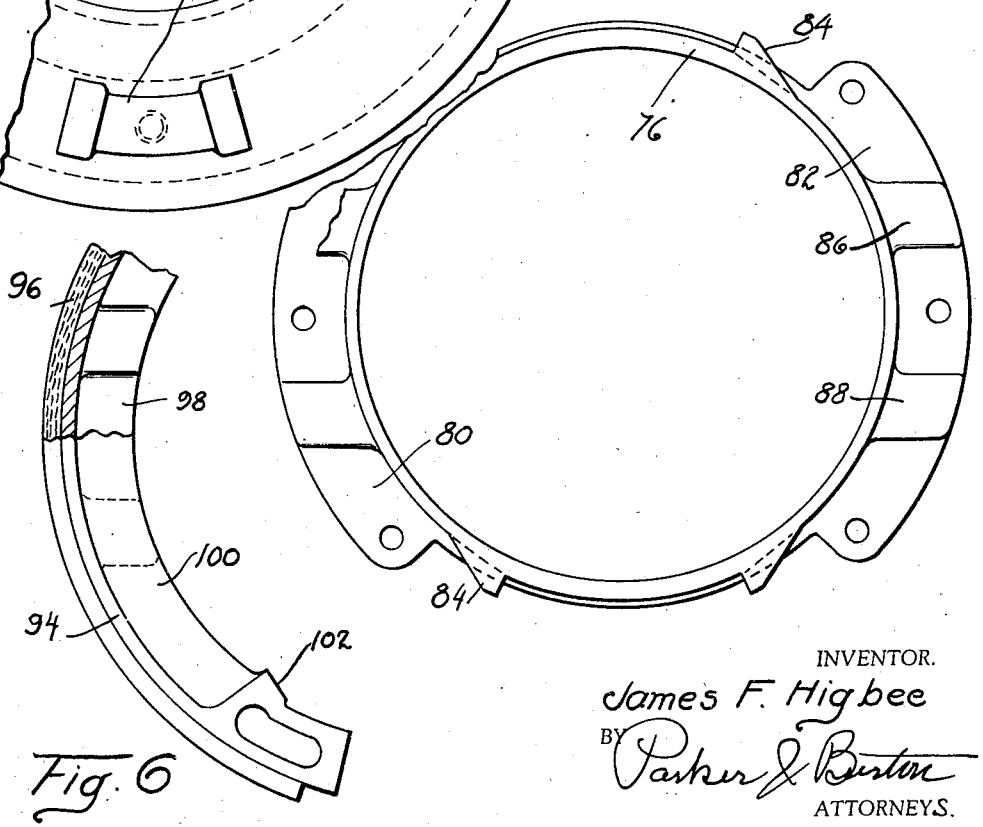

Patented May 21, 1935

2,001,875

UNITED STATES PATENT OFFICE 2,001,875

BRAKE

James F. Higbee, Detroit, Mich., assignor of one-half to Stephen A. Griggs, Detroit, Mich.

Application September 26, 1931, Serial No. 565,251

REISSUED

13 Claims. (Cl. 188—2)

My invention relates to dual wheel vehicle supporting assemblies and has particular reference to such an assembly wherein the two wheels are mounted for independent rotation.

Dual wheels have come into quite general usage in recent years, particularly in connection with heavy busses, trucks, trailers, et cetera, and hitherto these wheels have been mounted upon the supporting hubs in integral form so that both wheels necessarily rotated in unison at all times.

The improvement above referred to, wherein each of the wheels is free to rotate independently of the other, has been clearly set forth in my co-pending application Serial No. 453,373 and my patent, Number 1,809,699. This structure eliminates almost entirely the unnecessary wear and tear on tire casings utilized with such dual wheel assemblies. Where the two wheels are constrained to rotate in unison, the fact that the crown of the road over which the vehicle is traveling forces the inner tire to support most of the load, thereby flattening the tire casing somewhat and making the diameter of the inner wheel somewhat less than the diameter of the outer wheel, causes the tire casing on the outer wheel to drag over the road. Such dragging results in almost unbelievable and quite unnecessary wear on the outer tire casing. This difficulty has been eliminated by the provision of independently rotatable wheels.

The object of the present invention is to retain all of the advantages inherent in the improved structure described briefly above, while at the same time permitting the vehicle to be retarded through braking action on both of the wheels. Much of the unnecessary drag on the tire casings associated with dual wheel assemblies occurs when the assembly is turned about a swivelling axis for steering purposes. Whether due to drag caused by the crown in the road or swivelling action of the dual wheel assembly, the difference in the speed of rotation of the two wheels is never great.

More specifically, the object of my invention is to provide retarding means for a dual wheel assembly of this type which is operable, upon normal application of the brakes by the vehicle operator in the customary manner to transfer the braking torque to each of the wheels. The net result of this operation is to lock the two wheels together during the application of the brakes in such manner that the retarding effect is transmitted through both wheels simultaneously, thus doubling the efficiency of the braking operation.

A further object of the invention is to so arrange and proportion the friction surfaces applicable to the two independently rotatable wheels that when the braking torque reaches a point where the inner wheel is locked against rotation, and therefore skids along the ground, the outer wheel will continue to rotate. During this continued rotation there will be a constant retarding effect upon the outer wheel but its rotation substantially eliminates the possibility of skidding laterally.

Various other meritorious features of the invention will be apparent from the following description taken in conjunction with the drawings wherein:

Fig. 2 is a section along line 2—2 of Fig. 1,

Fig. 3 is a section through line 3—3 of Fig. 2,

Fig. 4 is a side elevation of the clutch actuating arrangement, and

Figs. 5 and 6 are details of the clutch mechanism.

Figure 1:
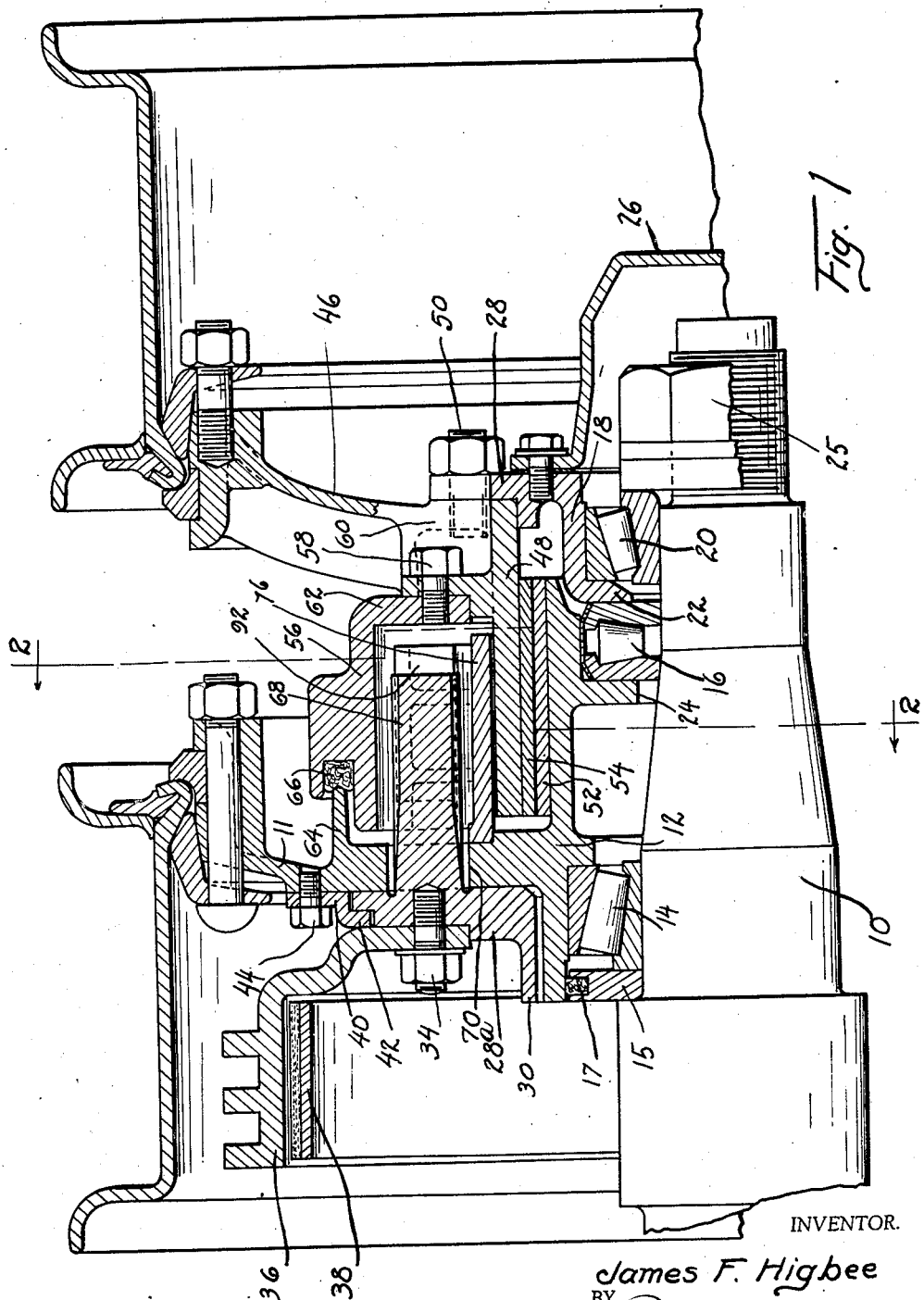
Fig. 1 is a sectional elevation of my improved assembly.

Referring now to the drawings, numeral 10 indicates a conventional spindle upon which the dual wheel assembly is mounted. Each of the wheels is built up from a plurality of parts. The inner wheel proper 11 includes a hub portion 12 which is seated at its inner extremity upon a rotary bearing assembly 14 and supported at its outer extremity upon a thrust bearing assembly 16. An annular thrust plate 15 and a packing ring 17 associated therewith position the bearing assembly 14 and protect the same from dust and dirt. A secondary hub 18 which supports the outer wheel is positioned upon a rotary bearing assembly 20 and provided with a radial flange 22 extending inwardly which is adapted to abut the thrust bearing assembly 16. This thrust bearing assembly is positioned on its outer side by means of a radial flange 24 extending inwardly intermediate the extremities of hub portion 12. The entire assembly is secured in place by nut 25 screwed on the extremity of spindle 10 and hub cap 26 is bolted to an outwardly extending radial flange 28 on the outer extremity of secondary hub 18.

The inner wheel assembly includes an annular ring 28ᵃ having a laterally extending flange 30. This ring has a limited movement of rotation upon the inner extremity of hub portion 12. Bolted as at 34 to the inner face of ring 28ᵃ is a conventional brake drum 36. Any desired type of brake mechanism, broadly indicated at 38, may be positioned within the drum.

Another annular ring 40 is provided with an offset flange 42 around its inner periphery, which flange is adapted to seat between the outer face of brake drum 36 and a cut away portion on the inner face of the outer periphery of ring 28. The ring 40 is bolted, as at 44, at circumferentially spaced apart intervals to the inner wheel 11. In this way the drum 36 is free to rotate within limits with respect to wheel 11, the relative movement being limited by means hereafter to be described. Any suitable type of rim may be positioned upon the wheel 11. In the drawings I have illustrated an improved wheel and rim assembly, but this phase of the structure is brought out more clearly in my copending application Serial No. 560,308, filed August 31, 1931, filed contemporaneously herewith.

The outer wheel 46 includes a sleeve portion 48 which is adapted to telescope over the hub portion 12 of inner wheel 11. The said outer wheel 46 is secured to flange 28 of secondary hub 18 by means of a series of circumferentially spaced apart bolts 50. A hardened steel sleeve 52 is press fitted around the outer surface of hub portion 12 and a similar hardened steel sleeve 54 is press fitted within the inner surface of the sleeeve portion 48 of the outer wheel 46. It will therefore be apparent that the outer wheel assembly is so positioned upon the supporting spindle 10 that it is free to rotate thereabout independently of the inner wheel 11.

What may be regarded as a secondary drum 56 is associated with the outer wheel 46 and secured to the said wheel in any suitable manner, as by means of bolts 58 which may extend through the central or hub portion 60 and the wheel 46 and inwardly extending radial flange 62 of the said secondary drum. The inner wheel 11 is provided with a laterally extending circumferential flange 64 which is adapted to engage a seal ring 66 fitted in a circumferential groove provided in the secondary drum 56. In this way the mechanism within the drum 56 is protected from the entrance of dust and dirt.

Extending laterally away from the annular ring 28 at diametrically opposed portions thereof are two brake actuating members 68. These actuating members 68 extend through slots 70 in the disk portion of wheel 11. These slots are so proportioned that not until the friction facings of the secondary drums is worn away do the actuating elements reach the extremities of the slots upon relative movement of the wheel 11 and drum 36. No adjustment of the secondary shoes, to be described hereinafter, is necessary until the friction facings are completely worn away and replacement becomes necessary. In the particular form disclosed in the drawings, each of the actuating elements 68 includes an arcuate element provided with a head 72 and 74 at each extremity thereof.

Bolted to the wheel 11, as clearly indicated in Fig. 3, is an arcuate cam member 76. The cam member 76 is secured to the wheel 11 by means of spaced apart bolts 78 extending through diametrically opposed flanges 80 and 82 and provided with camming portions 84 on its outer cylindrical face adjacent each extremity of each of the flanges. The cam member 76 is secured to the wheel 11 and the two constitute an integral structure. Intermediate the pairs of cams 84 and adjacent the flanges 80 and 82 are spaced apart stop elements 86 and 88 which are adapted to seat extremities of coil springs 90, as indicated in Figs. 2 and 3.

A pair of retarding elements or brake shoes 92 and 94 are positioned within the secondary drum 56 and each are provided with friction lining as indicated at 96 in Fig. 6. The extremities of each of these shoes are adapted to abut the enlarged ends 72 and 74 of the actuating elements 68, as clearly disclosed in Fig. 2. Each of the shoes is substantially channel shaped in cross section as seen from Fig. 3, the bottom of the channel being adapted to seat upon the stop elements 86 and 88. The side walls 98 and 100 are bulged inwardly at intervals spaced to correspond with stop elements 86 and 88 of cam member 76, as at 89 (Fig. 3) whereby the brake shoes are adapted to abut the extremities of the coil springs 90. The ends of each of the retarding elements 92 and 94 are provided with cam surfaces 102 which are adapted to cooperate with the cam surfaces 84 on element 76, upon which they rest, for the purpose of forcing the said retarding elements outwardly when the actuating elements 68 move with relation to wheel 11 to thereby exert pressure upon the secondary drum 56.

The operation of the structure will be apparent from the foregoing description. When the retarding means 38 is applied to the drum 36 through conventional remote control mechanism by the vehicle operator, the fact that the inner wheel 11 is free to rotate with respect to the said drum will cause an immediate tendency for the said inner wheel to overrun the drum 36. Since the so-called actuating elements 68 are integral with the drum 36 and since the cam member 76 is integral with the inner wheel 11, there will likewise be a tendency for the cam member 76 to overrun the actuating elements 68.

Secondary retarding means, brake shoes 92 and 94, are floatingly supported upon the cam member 76 and its cam surfaces 102 rest upon corresponding cam surfaces 84 on the cam member 76. The ends of the shoes 92 and 94 abut the extremities of actuating elements 68. It will therefore be apparent that this overrunning tendency of the inner wheel 11 and the cam member 76 integral therewith will tend to force the secondary shoes 92 and 94, which are positioned by the actuating elements 68 integral with the drum 36, outwardly against the inner surface of the secondary drum 56. When the secondary shoes have been so forced outwardly and have reached the limit of their movement there can be no further relative rotation or movement between the cam surfaces 102 and 84. The result is that the cam member 76 and the inner wheel 11 integral therewith are locked to the secondary drum 56 and its associated outer wheel 46 for simultaneous rotation therewith. Continued effort exerted upon the brake mechanism 38 by the vehicle operator will be transferred to both the inner and outer wheels, the braking effect upon the vehicle being in this manner doubly effective.

However, the friction surface and actuating leverage associated with the retarding means 38 is so proportioned to the friction surface afforded by the secondary shoes 92 and 94 and the leverage provided by the cam surfaces 102 and 84 that when the effort applied by the vehicle operator to the drum 36 produces sufficient braking effect upon the inner wheel to lock the same against further rotation, the outer wheel 46 may still continue to rotate. In this way the possibility of lateral skidding by virtue of dragging both tires along the ground is obviated, while at the same time a maximum braking effect up to the danger point is secured.

Having described one specific modification of my improved structure various others will be apparent to those skilled in the art and for that reason I intend to limit myself only within the scope of the appended claims.

What I claim:

1. A vehicle road wheel assembly comprising a pair of road wheels, a drum carried by each wheel, brake mechanism operable to retard the rotation of one drum, and applying mechanism for said brake mechanism associated with the other drum and its wheel to be actuated thereby.

2. A vehicle road wheel assembly comprising a pair of road wheels, a drum carried by each wheel, one of said drums being located between the two wheels, brake mechanism operable to retard the rotation of one drum, and applying mechanism for said brake mechanism associated with the other drum and its wheel to be actuated thereby.

3. In combination with a pair of adjacent vehicle supporting wheels mounted upon a common spindle for rotation independently of one another, a brake drum associated with one of the wheels to permit rotation relative thereto, retarding means associated with the other wheel, and means associated with said last mentioned wheel coupled with said drum whereby rotation of said drum relative to its associated wheel operates said retarding means.

4. In combination with a pair of adjacent vehicle supporting wheels mounted upon a common spindle for rotation independently of one another, a brake drum associated with one of the wheels to permit limited rotation relative thereto, retarding means associated with the other wheel, and means associated with said last mentioned wheel coupled with said drum whereby rotation of said drum relative to its associated wheel operates said retarding means.

5. In combination with a vehicle supporting wheel, a brake drum associated therewith to permit rotation with respect thereto, and means for limiting such relative movement.

6. In combination with a vehicle supporting wheel, a brake drum associated therewith to permit rotation with respect thereto, and means integral with the drum adapted to cooperate with the wheel for limiting such relative movement.

7. In combination with a vehicle supporting dual wheel assembly comprising a pair of independently rotatable wheels, retarding means associated with each of said wheels, and means coupling said retarding means whereby actuation of the one automatically operates the other.

8. In combination with a vehicle supporting dual wheel assembly comprising a pair of independently rotatable wheels, retarding means associated with each of said wheels, and means whereby braking torque upon one of said retarding means automatically actuates the other retarding means.

9. In combination with a vehicle supporting dual wheel assembly comprising a pair of independently rotatable wheels, retarding means associated with one of said wheels including a brake drum capable of limited rotation with respect thereto, and retarding means associated with the other of said wheels and coupled with the said drum.

10. Structure of the class described comprising a spindle, juxtaposed wheels mounted thereon for independent rotation, a brake drum secured to one of said wheels, a brake drum associated with the other of said wheels to permit limited relative rotary movement with respect thereto, retarding means positioned within each of the drums, and means coupling the relatively movable drum and the retarding means associated with the other drum for operating the same.

11. In combination with a vehicle supporting dual wheel assembly, retarding means associated with each of the wheels, and means coupling said retarding means whereby actuation of the one automatically operates the other.

12. Brake mechanism including, in combination, a wheel, a brake drum supported thereby for limited rotation with respect thereto, retarding means positioned within the drum and operable upon actuation thereof to cause rotation of the drum with respect to its wheel through a limited arc, and means for limiting said relative movement whereby the braking torque is subsequently transferred from the drum to the wheel.

13. In a dual wheel assembly, including a brake drum for each wheel, a brake for each drum, retarding means associated with each drum, and means coupling one of said drums with the retarding means of the other drum whereby braking torque applied to the one drum actuates the retarding means of said other drum.

JAMES F. HIGBEE.